(12) United States Patent
Virtanen

(10) Patent No.: US 8,192,542 B2
(45) Date of Patent: Jun. 5, 2012

(54) AQUEOUS SUSPENSION BASED ON HYDRAULIC BINDER AND A PROCESS FOR THE PRODUCTION THEREOF

(75) Inventor: Pentti Virtanen, Valkeakoski (FI)

(73) Assignee: Nordkalk Oyj ABP, Pargas (FI)

( * ) Notice: Subject to any disclaimer, the term of this patent is extended or adjusted under 35 U.S.C. 154(b) by 838 days.

(21) Appl. No.: 12/093,988

(22) PCT Filed: Nov. 20, 2006

(86) PCT No.: PCT/FI2006/000381
§ 371 (c)(1),
(2), (4) Date: Nov. 19, 2008

(87) PCT Pub. No.: WO2007/057510
PCT Pub. Date: May 24, 2007

(65) Prior Publication Data
US 2009/0090278 A1  Apr. 9, 2009

(30) Foreign Application Priority Data
Nov. 18, 2005  (FI) ...................................... 20051183

(51) Int. Cl.
*C09C 1/02* (2006.01)
(52) U.S. Cl. ........ 106/463; 106/464; 106/465; 423/432; 428/403
(58) Field of Classification Search .................. 106/463, 106/464, 465; 423/432; 428/403
See application file for complete search history.

(56) References Cited

U.S. PATENT DOCUMENTS

| | | | |
|---|---|---|---|
| 4,588,443 A | 5/1986 | Bache | |
| 5,122,191 A | 6/1992 | Morozumi et al. | |
| 5,626,665 A | 5/1997 | Barger et al. | |
| 5,788,762 A | 8/1998 | Barger et al. | |
| 5,958,131 A | 9/1999 | Asbridge et al. | |
| 5,976,241 A | 11/1999 | Kim et al. | |
| 6,027,561 A | 2/2000 | Gruber et al. | |
| 6,402,831 B1 | 6/2002 | Sawara et al. | |
| 6,602,484 B1 * | 8/2003 | Virtanen | 423/430 |
| 2002/0091177 A1 | 7/2002 | Gonnon et al. | |
| 2004/0234443 A1 | 11/2004 | Chen et al. | |
| 2005/0000393 A1 | 1/2005 | Virtanen | |

FOREIGN PATENT DOCUMENTS

| | | |
|---|---|---|
| CN | 1193602 A | 9/1998 |
| EP | 1396474 A2 | 3/2004 |
| FI | 115046 B | 2/2005 |
| FI | 115047 B | 2/2005 |
| JP | 2005126294 A | 5/2005 |
| WO | 9623728 A1 | 8/1996 |
| WO | 9738940 A1 | 10/1997 |
| WO | 9829601 A2 | 7/1998 |
| WO | 9841475 A1 | 9/1998 |
| WO | 9912851 A1 | 3/1999 |
| WO | 9912852 A1 | 3/1999 |
| WO | 0047817 A1 | 8/2000 |

OTHER PUBLICATIONS

International PCT Search Report for PCT/FI2006/000381 dated Feb. 16, 2007.
International PCT Search Report for PCT/FI2006/000380 dated Feb. 16, 2007.
U.S. Appl. No. 12/094,012, filed May 16, 2008.

* cited by examiner

*Primary Examiner* — Paul Marcanton
(74) *Attorney, Agent, or Firm* — McCormick, Paulding & Huber LLP

(57) ABSTRACT

Method for producing an aqueous suspension, which is based on a hydraulic binder, and a hardened binder product. According to the invention, a composition of blending agents is added in the aqueous phase into the binder, which composition comprises calcium carbonate particles having an average particle size of 2-200 nm, in order to generate an aqueous suspension and, if needed, mineral fillers are added into this suspension, in order to produce a hardening plaster or concrete mixture. Besides calcium carbonate, the composition of blending agents can comprise calcium hydrogen carbonate and meta-kaolin sinter, too. By using the present invention, it is possible to improve the properties of products which are bound by hydraulic binders; with the described combination of blending agents it is possible to affect for instance the early strength, the frost resistance, the phenomenon of bleading, the plasticizing, the size of the transition zone and the durability of concrete or plaster, and to reduce the quantity of the hydraulic binder.

24 Claims, No Drawings

AQUEOUS SUSPENSION BASED ON HYDRAULIC BINDER AND A PROCESS FOR THE PRODUCTION THEREOF

CROSS REFERENCE TO RELATED APPLICATIONS

This application is entitled to the benefit of and incorporates by reference essential subject matter disclosed in International Patent Application No. PCT/FI2006/000381 filed on Nov. 20, 2006 and Finish Patent Application No. 20051183 filed Nov. 18, 2005.

FIELD OF THE INVENTION

The present invention relates to a method for producing an aqueous suspension based on a hydraulic binder.

The present invention also relates to a method for producing a hardened stone material and to aqueous suspension product.

BACKGROUND OF THE INVENTION

Products such as concrete structures and plasters, which are bound with cement and corresponding hydraulic binders, are very common and well studied. The problems associated with them are familiar, too. The problems of the production process are related, among other things, to the water which is left over when the chemical water, required by the reaction of the hydraulic binder, and the gel water have been consumed. This residual water affects the workability of the product. Plasticizers have been developed to reduce the quantity of this residual water, but these are attached to the reactive spots of the cement particles and compete with the ions generated in the hydration reaction. The plasticizers are generally organic polymers and it is not desirable to use large quantities of them in concrete.

Another major drawback is the calcium hydroxide, $Ca(OH)_2$, which is generated during the hydration process, the amount generated being 0.29 kg per each kilogram of cement. Some of the $Ca(OH)_2$ crystals are hexagonal plate packs, the structure of which is weak. To overcome this problem, pozzolanic materials, such as silica ($SiO_2$), are employed to reduce the amount of calcium hydroxide. However, although pozzolanic materials use up calcium hydroxide during the pozzolanic reaction, they require more water in order to loosen the structure than the pozzolanic reaction consumes.

In known concrete structures, micro cracks in hardened cement still appear, which cracks are generated because of, among other things, autogenic shrinkage. To prevent these, a higher w/c ratio is needed than the chemical water and gel water require. The "w/c" ratio means the weight ratio between water and binder.

Yet another problem area is the joint zone, i.e. the transition zone between the cement paste and the aggregate, in which zone most internal cracks in the concrete occur. When fractures in concrete structures are examined, it is found that the fracture always starts in this joint zone and then extends into the plaster. It is possible to reduce the size of the transition zone by decreasing the w/c ratio, but problems occur: either the workability is reduced or more plasticizer is needed.

Yet a further problem is that with modern technology the heat treatment must be limited because the heat expansion of concrete has been in the past non-linear and the various components of the concrete have had different coefficients of heat expansion. There have been affected by the air dissolved in water, the air in gaseous state and the water in the concrete. Consequently, it has not been possible to fully exploit the shortened processing time enabled by heat treatment—according to a rule of thumb, the processing time is cut by half for each 10 degree rise in the temperature. Industrial production of construction components requires a shorter concrete hardening time, which is made possible by moving from mechanisation to automation, which cuts production costs. With cast-in-place processes, for instance, heat treatment speeds up the work, too.

The estimated useful lifespan of modern concretes is only 50 years, which demonstrates the extent of the problems. In 2005, a useful lifespan of 100-200 years was introduced into the standards. This is mainly a result of the decision to increase the protective distance of steel. However, circumstances which essentially would increase the useful life of concrete remain unresolved.

SUMMARY OF THE INVENTION

The purpose of the present invention is to generate a solution for improving the properties of products which are bound by hydraulic binders, such as portland cement and blast-furnace slag cement, and for simplifying the production of both concrete and plaster. Another purpose of the invention is to reduce, or totally eliminate, the problems which arise in the production of hardened products based on hydraulic binders.

Furthermore, the purpose of the present invention is to generate a group of blending agents, which can be used to make products of the highest standard, without increasing costs.

Associated with the present invention, we have found that characteristic of colloidal particles is that the heat kinetic motion, i.e. the Brownian motion, and the repellent forces between the particles can neutralize the effect of the gravitational force. Colloidal particles are particles, the size of which is approximately 1 nm-1 μm. In a slurry, such as a slurry comprising hydraulic binder, the mechanical, capillary and flocculating forces are small. Consequently, the slurry is stable when the colloidal forces predominate.

Furthermore, it is characteristic of cement paste that the size of the cement particles is in the precolloidal range, which gives the slurry a high cohesion and low fluidity. The fluidity of the plaster formed of the cement paste and the filler decreases further if 90% of the particles are smaller than 60 μm Ø.

On the basis of what is presented above, the present invention is based on the idea that in hydraulic binder products a combination of blending agents is used which comprises nanosized calcium carbonate particles, the size of which is 2-1000 nm, preferably approximately 2-500 nm, especially approximately 2-200 nm. These colloidal $CaCO_3$ particles of size 2-200 nm prevent the separation of water and plasticize the binder paste, even though the other particles of the binder mixture are within the precolloidal size range and even if the form factor of the cement particles is bad.

Thus, the present invention generates a method for producing an aqueous suspension based on a hydraulic binder, in which method a combination of blending agents is added in the aqueous phase into the hydraulic binder, to form an aqueous suspension. Hereinafter, this combination is also referred to as the "composition of blending agents", which comprises calcium carbonate particles, especially precipitated calcium carbonate particles (PCC), the average particle size of which is 2-1000 nm.

Furthermore, the present invention generates an aqueous suspension of hydraulic binder, which suspension comprises a hydraulic binder which is mixed into water, in which case the ratio between the parts by weight of the water and the binder (w/c) is approximately 0.3-0.6, and which suspension comprises, per 100 parts by weight of binder, 1-10 parts by weight of calcium carbonate particles, especially PCC particles, the average particle size of which is generally 2-1000 nm, preferably 2-200 nm.

In addition to the components described above, the aqueous dispersion of the blending agents can comprise calcium hydrogen carbonate and meta-kaolin sinter and possibly refined limestone.

More specifically, the method according to the present invention is mainly characterized in that the aqueous suspension of the binder is mixed with such a water-containing composition of blending agents which comprises particles of precipitated calcium carbonate having an average particle size of 2-1000 nm, and calcium hydrogen carbonate, and the pH value of the aqueous phase of which is below 7.

The method for producing a hardened product according to the present invention is, in turn, characterized in that an aqueous suspension, which is based on a hydraulic binder, is produced with a method described above and the aqueous suspension is allowed to harden, and the aqueous suspension according to the present invention is in that the suspension comprises 1-10 parts per weight of calcium carbonate particles, which have an average particle size of 2-200 nm, per 100 parts per weight of binder, and the pH value of which is below 7.

Considerable advantages are obtained by means of the present invention. Thus, using the described combination of elements, it is possible to economically improve the properties of products which are bound with a hydraulic binder. With the combination of blending agents it is possible to affect, among others, the early strength, the frost resistance, the phenomenon of bleading, the plasticizing, the size of the transition zone and the lifespan, and to decrease the amount of the hydraulic binder.

The present invention can be applied, among other things, to concrete structures, where the drawn steel rods of reinforced concrete have been replaced with a shell span, and to half-stressed structures, in which pre-stressed steels have been enhanced with a shell span. Products which are bound with hydraulic binders and enhanced with the appropriate combinations of blending agents and which have been applied to properly constructed structures will be economical and durable products wherever they are used.

Even though colloidal calcium carbonate particles significantly improve the workability of the mixtures, the combination of blending agents according to the present invention can comprise a plasticizer, too. Preferably, an intensive plasticizer such as this can be brought into the mixture already attached to calcium carbonate particles. It is possible to add an intensive plasticizer, which is attached to "CaCO3<200 nm" particles, into the concrete water before the concrete is mixed. In this case, the plasticizing assists in the homogeneous mixing and no additional mixing time is needed.

By using a combination of blending agents according to the present invention, it is possible to satisfy the demands of all structures using one basic formula.

The type of structure to be built should determine which products (e.g. plaster and concrete), bound with hydraulic binders, as described above, will be used. Today, the typical expected useful lifespan of structures ranges from 50 years to as much as 200 years. The present invention, coupled with the appropriate materials and production technologies, can help to achieve such long lifespans.

In the following, the present invention will be examined in more detail with the aid of a detailed description.

DETAILED DESCRIPTION OF PREFERRED EMBODIMENTS

As described above, according to the present invention, a combination/composition of blending agents is added into the hydraulic binder, which composition comprises calcium carbonate particles, in order to form an aqueous suspension. These particles are especially precipitated calcium carbonate, i.e. PCC. If not otherwise indicated below, in the present invention "calcium carbonate" means precipitated calcium carbonate.

The average particle size of the calcium carbonate particles is 2-1000 nm, typically 200 nm or less, preferably approximately 2-100 nm. This composition of blending agents is most suitably brought in the aqueous phase, in which case the aqueous suspension of the binder is mixed with such a water-bearing composition of blending agents which comprises calcium carbonate particles and calcium hydrogen carbonate, and the pH value of the aqueous phase of which is below 7, most suitably approximately 5.5-6.5. Calcium hydrogen carbonate is generated in the composition of blending agents during the production of the precipitated calcium carbonate, when the calcium hydroxide is carbonated in conditions which are described in more detail below.

The quantity of the calcium carbonate to be added varies depending on the surface area of the binder, as described in more detail below. However, it is typically approximately 0.1-20% of the binder quantity, especially approximately 0.5-15 weight %, more preferably approximately 1-10 weight %.

Consequently, when concrete is produced, the quantity of the calcium carbonate particles is approximately 0.1-100 kg, in particular approximately 0.5-50 kg, especially approximately 1-20 kg per cubic meter of concrete to be produced.

According to one embodiment, an aqueous suspension of a hydraulic binder is generated, which comprises a hydraulic binder which is mixed into water, in which case the ratio between the parts by weight of the water and the binder (w/c) is approximately 0.3-0.6. Such a suspension comprises, per 100 parts by weight of binder, 1-10 parts by weight of calcium carbonate particles, the average particle size of which is 2-1000 nm. In addition, it comprises 0.01-1 parts by weight of calcium hydrogen carbonate.

Most suitably, meta-kaolin sinter particles are further added into the aqueous suspension, the amount of which particles is, after the addition, approximately 4-30 weight % of the amount of binder. The average size of the meta-kaolin sinter particles used is at maximum approximately 100 μm; preferably, 90% of the particles are smaller than 60 μm. Their density is approximately 0.6-1.4 g/cm$^3$ and they comprise 5-70 weight %, preferably 20-40 weight % of meta-kaolin.

If desired, before the addition it is possible to attach some plasticizer onto the surface of the calcium carbonate particles. Furthermore, limestone powder, the particle size of which is 0.1-2 mm, can be added into the aqueous suspension.

The composition of blending agents, which comprise calcium carbonate particles and calcium hydrogen carbonate, is produced by bringing the calcium oxide-bearing initial material into contact with carbon dioxide in the aqueous phase, in which case the calcium carbonate crystals or particles are generated in a mixture, the pH of which is below 7. Especially, the product is produced by hydrating calcium oxide with water at a temperature of over 100° C. and at overpressure, to form calcium hydroxide, and by carbonating the generated calcium hydroxide at approximately 20-100° C., most suitably at overpressure, until the pH value of the mixture is less than 7, to produce an aqueous suspension which comprises calcium carbonate and calcium hydrogen carbonate.

The production of an aqueous phase comprising calcium carbonate particles and calcium hydrogen carbonate is described in more detail in our parallel patent application, which is called "Process and apparatus for producing suspensions of solid matter".

According to the present invention, it is possible to produce hardened stone material product by letting the aqueous suspension, which is described above and which is based on hydraulic binder, harden. It is possible to mix aggregate into the aqueous suspension in a way which is known per se. Accordingly, when concrete is produced from the present binder mixtures, a stone material is added into the mixture as the aggregate. The amount of stone material is approximately 50-85% of the volume of the concrete, especially approximately 65-75%, and it comprises stone grains of different sizes (0.02-16 mm). The coarsest part of the aggregate is formed of crushed rock or natural gravel and finest part of natural sand. Crushed concrete, too, can be used as aggregate.

The combination of blending agents according to the present invention can be used in different types of concretes. Examples of these are:
1. Standard concrete, vibration compressed, strength class <60 MPa
2. Self-levelling concrete, used in horizontal castings
3. Self-compressed concrete, very fluid, fills the mould without requiring mechanical compressing
4. High-strength concrete, strength class >60 MPa, compressing technique optional
5. Fire-resistant concrete, strength class <60 MPa (>60), compressing technique optional
6. Frost-resistant concrete, strength class <60 MPa < >60 MPa, low temperature test (−20° C.), compressing technique optional
7. Arctic concrete, strength class <60 (>60), frost resistance −50° C., compressing technique optional
8. Dynamic load resistant concrete, strength class <60 MPa (>60 MPa)
9. Corrosion resistant concrete, cement quality sulphate resistant, strength class <60 MPa (>60 MPa), compressing technique optional Using a combination of blending agents according to the present invention, it is possible to carry out economically production of the concrete for the structures in question. Besides concretes, it is possible to produce plaster.

In the following, the components of the blending agent combinations described above and how they affect the properties of the binder mixtures will be examined in more detail. It should be noted that the present invention is not restricted to these models, even though ideas are presented below regarding the influence of the mechanisms of the components Basic Components:
1. Hydraulic binder
2. Calcium carbonate particles and calcium hydrogen carbonate
3. Meta-kaolin sinter
4. Limestone 0-8 mm, especially approximately 0-2 mm, Ø.

Most suitably calcium carbonate particles are used in such a composition of blending agents which comprises calcium carbonate particles and calcium hydrogen carbonate, and the pH value of which is below 7, preferably approximately 5.5-6.5.

Complementary Components:
5. A plasticizer, such as CaPCE (can be brought into the mixture in the form of calcium carbonate and polymerized carboxyl ether).

The addition and the use of the blending agent is dependent on the manner in which the concrete is compressed; both mechanical compressing and self-compressing solutions are possible.

A conventional hydraulic binder, such as portland cement, rapid cement or blast furnace cement or a corresponding cement which is capable of setting and hardening in the presence of water, is used in the present invention. It is possible to use low-heat cement (abbreviated to LH) and sulphate resistant cement (abbreviated to SR). The latter is known to be suitable for sea structures and structures which are in contact with sulphate-bearing ground. However, with a solution according to the present invention it is possible to reduce the sensitivity of the binder to demanding conditions, in which case more affordable types of binders can be used in the described objects.

The quality and quantity of the cement and its fineness affect the development of the strength of the concrete in question. Accordingly, coarse refined cement generally reacts slowly with water, in which case the rate at which heat is generated is slow. Thus, the binder is typically refined to a fineness which is approximately 50-1500 $m^2$/kg, typically approximately 100-1000 $m^2$/kg, depending on the application. Generally, the fineness is approximately 150-500 $m^2$/kg.

Combinations and mixtures of binders, too, can be used in the present invention. It is well known that the generation of heat is slower with blast furnace slag than with standard cement, in which case it is possible to adjust the setting of the cement by adding blast furnace slag into the portland cement. Generally, the amount of the first component (such as portland cement) is approximately 20-98 weight % of the weight of the hydraulic binder and, correspondingly, the amount of the second component (such as blast furnace slag cement) approximately 80-2 weight %.

According to the present invention, a combination of blending agents is added into the binder or binder mixture, the most important component of which agents is calcium carbonate, which is used in the form of nanosized calcium carbonate particles. With them it is possible to substantially affect, above all, the manner in which the water is separated.

It is well-known that separation of water takes place upwards and arrangement of heavier particles downwards, in the cement slurry. In addition, microbleading takes place—this bleading takes place at the microlevel and it appears on the lower surface of the aggregate particles and steels.

According to the present invention, the binder is mixed in the aqueous dispersion with the nanoparticle-like calcium carbonate; the calcium carbonate can be brought into the binder for instance with the concrete water. A concrete water such as this comprises both calcium carbonate particles of nanoparticle size and calcium hydrogen carbonate, the formula of which is $Ca(HCO_3)_2$.

The nanosized calcium carbonate particles, which are here also marked "$CaCO_3$<200 nm", have a large specific surface area. Typically nanoparticles, the quantity of which is approximately 2-10 kg/concrete $m^2$ and the surface area of which is approximately 50,000-220,000 $m^2$, are used.

Together with the calcium hydroxide which is released during the hydration reaction of the binder, the calcium hydrogen carbonate, which is in the mixture comprising hydraulic binder and nanoparticle-like PCC (i.e. precipitated calcium carbonate), forms more calcium carbonate, according to the following reaction (quantities are calculated per cubic meter of concrete mass):

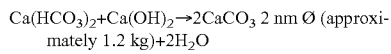
$Ca(HCO_3)_2 + Ca(OH)_2 \rightarrow 2CaCO_3$ 2 nm Ø (approximately 1.2 kg) + $2H_2O$ The particles are generated everywhere in the concrete water, when the hydration product $Ca(OH)_2$ reacts with the $Ca(HCO_3)_2$ which is in the solution, and their total surface area is approximately 1,500,000 m². The surface area of cement is approximately 125,000 m².

The particles act like colloidal particles. In ample volumes of water, they are very mobile but when the volume of water is reduced they are gelled. The result is a thixotropic behaviour; the 2-200 nm particles of $CaCO_3$ plasticize the cement plaster in the mixing and at the working stage and hardens it when the mixing stops, in which case the particles thus prevent the water from separating at the micro level and at the macro level. Part of the 2-200 nm particles of $CaCO_3$ remains in the capillary water of the concrete and, as a result, they reduce the chemical potential of the water and, at the same time, the formation temperature of ice.

The "$CaCO_3$<200 nm" particles also act to equalize the w/c ratio of the cement particles of different size. When the distance between the cement particles—the large particles are >11 μm Ø and the small particles are <11 μm Ø—is constant, the result is a substantial variation of the w/c ratio between the different cement particles. The form factor of the cement particles is more advantageous for small particles, which partly equalizes the difference.

When "$CaCO_3$<200 nm" particles, according to the present invention, are brought into the binder mixture, the number of particles is typically 2,000-20,000 per each cement particle and they are very homogeneously distributed, in which case they partly shape the jagged large cement particles into spherical forms which allows small cement particles to move closer to each other. As a result, the w/c ratio evens out between the different cement particles in such a manner that it corresponds to hydration.

As described above, the quantity of the calcium hydrogen carbonate in the binder mixture varies according to the progress of the hydration reaction. In the initial stage, together with the concrete water (or, more generally speaking, "hydration water") typically approximately 0.01-10 parts by weight, especially approximately 0.05-5 parts by weight, calcium hydrogen carbonate per 100 parts by weight of binder, is added into the mixture. Because the calcium hydrogen carbonate reacts with the calcium hydroxide, which is released from the hydration, the amount of the calcium hydrogen carbonate decreases and is only quite small in the hardened product.

Meta-kaolin sinter, too, can be included in the combination of blending agents.

The use of meta-kaolin as an additive in cement is known per se. Accordingly, U.S. Pat. No. 6,027,561 describes a composition which includes cement and highly active pozzolan which comprises meta-kaolin. This is produced by heat treating kaolin, elutriating it in water and drying the sludge by spray-drying, in which case small pearls (agglomerated beads) are generated, the diameter of which is at least 10 microns. They are built up of particles, the size (d50) of which is 5 microns or less. A known dispersant can be added into the meta-kaolin.

Other patents, in which meta-kaolin has been used as an additive in cement, are, for instance, the U.S. Pat. Nos. 5,976,241, 5,958,131, 5,626,665, 5,122,191 and 5,788,762. In the last of these, there is an extensive survey of the use of meta-kaolin and its advantages as an additive in cement. A general characteristic of all solutions is the use of meta-kaolin as such, in which case its pozzolanic properties are exploited.

In the present invention, more preferably a product is used which is described in our previous FI patent 115046 and which comprises spherical, porous agglomerates which, in turn, at least partly comprise meta-kaolin particles, in which case the size of the individual, porous agglomerates is approximately 2-500 microns, especially approximately 5-200 microns and in which case the density of their surface layer is lower than the density of the inner part. The pore structure is essentially similar in the surface layer and in the inner part.

The product can be produced with a method which is described in the FI patent 115047, according to which method kaolin agglomerates, the average particle size of which is approximately 2-100 micrometers, are first generated from kaolin and, after that, these agglomerates are calcined to meta-kaolin, in which case agglomerates are generated which have an open pore structure and a surface layer density which is lower than the density of the inner part and the pore structure of which in the surface layer and in the inner part is similar.

As an example, we present a summary of the typical properties of the meta-kaolin sinter particles which are more preferably used in the present invention:
1. Size c/c 20-40 μm
2. Steep distribution
3. Density 0.7 g/cm³
4. Spherical shape
5. Usage in concrete 20-60 kg/BET m²
6. Absorbed water equal to their own weight
7. Absorption time approximately 1 minute
8. Pozzolanicity 5-40% (5-70%)
9. They release the water they absorbed as a result of the internal pozzolanic reaction and the precipitation of $Ca(OH)_2$
10. When they absorb water, they release gas as microbubbles. The bubbles comprise air or $CO_2$ or a mixture of them.

In plaster and concrete, the meta-kaolin sinter works in such a way that it enables, at the mixing stage, the use of sufficient water to generate a homogeneous mixture. An example of this is that concrete which has a w/c of 0.34, has a w/c of 0.4-0.6 at mixing. The meta-kaolin sinter releases water as the hydration advances, i.e. an internal irrigation system is generated, in which the meta-kaolin sinter acts as a water regulator in the paste.

Due to the spherical shape and typically steep particle size distribution, the added meta-kaolin sinter plasticizes the plaster. In addition, it increases the strength of the plaster with the help of the pozzolanic reaction and generates a controlled structure of protective pores in frost-resistant concretes.

The meta-kaolin sinter generates microbubbles, which plasticize the concrete and which, in case of fire, form a passage for discharging gas.

As described above, according to the present invention, the calcium carbonate particles which are brought, contained within the concrete water, into the binder, and which have a particle size of less than 1000 nm, typically 2-200 nm, settle between the cement particles thus reducing the friction between those particles, in which case they act as plasticizers. However, it is possible to further intensify the plasticizing by attaching plasticizer to the calcium carbonate particles, in which case the effect of the plasticizer remains constant in the mixing for more than three hours. Consequently, the concrete manufacturer knows the degree of plasticity of the concrete throughout the process right down to the point of casting, even though the starting time of the casting might vary. The colloidal 2-200 nm particles of $CaCO_3$ prevent the bleading phenomenon and give the plaster a thixotropic character, and thus prevent the separation of water both at the micro and the macro level, and the separation of the aggregate.

Preferably, the amount of the plasticizer is 1-40 mg/m$^2$, preferably 4-9 mg/m$^2$, of the surface area of the calcium carbonate particles.

Several advantages are achieved when the plasticizer molecules are first attached to the surface of the "CaCO$_3$<200 nm" particles:
1. Plasticizers which have only a steric property can be used.
2. The effect on the plasticity of the concrete is long-lasting.
3. Small filler particles are generated in the paste.
4. It is possible to mix the plasticizer into the concrete water, in which case the plasticizer will be effective right from the start of the mixing.
5. The plasticizer does not require additional mixing time.
6. The plasticizing effect is increased.
7. The micro and macro separation of the water decreases.
8. The early strength is not reduced.

It is possible to produce a combination of the calcium carbonate ("CaCO$_3$<200 nm") and plasticizer according to the following method:

The plasticizer molecules are bound to the surface of the CaCO$_3$ nanoparticles by mixing for instance the following components with each other:

"CaCO$_3$<200 nm", solids percentage 30-37
GLEN/um 5/(polycarboxylate), solids percentage 34

The blending mixture is added into the water, which already comprises "CaCO$_3$<200 nm" particles and Ca(HCO$_3$), and the pH value of which is approximately 5.5-6.5.

The effect of the plasticizer has been investigated experimentally, too:

A flow test was carried out by comparing the plaster which was prepared of the produced mixture with a plaster in which a plasticizer had been mixed after the premixing, after which the mixing had been continued for 3 minutes.

The mixture "CaCO$_3$<200 nm"+GL5i resulted in flow extents which were 10-15% larger Measurements carried out at intervals of 1 h, 2 h and 3 h, showed that the plasticity remained at the same level as in the test carried out 10 min after the mixing. After 6 h, the early strength was 32 MPa at 50° C. ($\approx$280° C. h); the corresponding figure for the plaster used to compare it was 30 MPa. The pre-attachment of the plasticizer did not slow down the effect of the "CaCO$_3$<200 nm" in the development of the early strength, but the flow extent was slightly improved and the mixing time was cut by 3 minutes and the initial mixing time by approximately 2 minutes.

The addition of 10 kg of "CaCO$_3$<200 nm"/BET m$^2$ stiffens up the mass before the plasticizer is added. This stiffening disappears when the plasticizer is pre-attached. Besides the components mentioned above, limestone, too, can be added into the binder mixture, especially finely ground limestone. Limestone, such as this, acts as a fine aggregate.

Typically, limestone with a grain size of 0.1-2 mm is added into the aqueous suspension. Preferably, limestone powder, which comprises at least 30 weight %, especially at least 50 weight %, most suitably approximately 60-100 weight % of calcium carbonate, is added. The quantity of the limestone powder can be approximately 0.2-4 fold, preferably approximately 0.5-3 fold the weight of the hydraulic binder.

In the past, there has been a problem with crystalline limestone: the bonds in the crystal clusters are weak. However, it is possible to overcome this by crushing the crystalline limestone material with a rotor crusher, in which case the weak crystal clusters are broken down. Alternatively, a high-frequency vibration cone crusher provides an efficient means to break down the crystal clusters.

The problem still remains that the crystal surfaces are smooth and the adhesion of the cement hydrate to the surfaces is poor. Now it has been discovered that a combination of blending agents according to the present invention significantly improves the adhesion. The reason is, among other things, that the adhesion of the nanoparticles to the crystal surfaces is firm and it is primarily based on the van der Waals' force. The average size of the nanoparticles is approximately 2 nm, in which case the adhesion of the "CaCO$_3$<200 nm" particles is good.

Furthermore, it has been found that the combination "CaCO$_3$<200 nm"+Ca(HCO$_3$)$_2$ together with a slightly acidic pH value (pH approximately 5.5-6.5) in the concrete water furthers the reaction of the limestone, which has a natural pH of approximately 9. As a consequence, the surface of the crystals can be roughened.

A physical connection, and a "wall phenomenon" which is related to that, is generated between the aggregate rock and the binder. However, this phenomenon is smaller when nanoparticles ("CaCO$_3$<200 nm") are used and it can still be decreased by lowering the water-cement ratio (for instance w/c<0.40).

Here, it should be pointed out that the forces, between the aggregate and the hardened cement paste, which load the structure are transferred via the "transition zone" which is between the aggregate and the binder. It is possible to increase the strength of the products (concrete), which are bound by hydraulic binders, by increasing the strength of the hardened cement paste. Generally, this accounts for ⅔ of the improvement of the strength. It is also possible to improve the interaction between the aggregate and the hardened cement paste, which gives ⅓ of the improvement of the strength.

Associated with the present invention, it is possible to substantially strengthen the connection between the aggregate and the binder, especially by using fine aggregate, i.e. limestone:
1. A chemical-physical connection is generated between for instance limestone and cement hydrate.
2. The water/cement ratio <0.4 decreases in the connection.
3. The use of nanoparticles <200 nm prevents the w/c ratio from increasing ("wall phenomenon") on the surface of the aggregate.
4. The extension of cracks is limited when a portion of fine aggregate is used.

In the following, the influence of the different components of the combination of blending agents on the stresses which are exerted onto the structure, will be examined. It should be pointed out that the models which are presented below, and which are illustrated with practical applications, too, represent theoretical studies, which describe potential mechanisms. However, we do not want to commit ourselves to these explanations, and, consequently, the present invention is not limited to them.

The Frost Resistance of Concrete:

In the concrete (paste), the frost resistance can be examined at two levels
1. lowering the temperature at which ice forms
2. creating a space to allow for the formation of ice crystals.
In a solution, according to the present invention, the temperature at which ice forms has been lowered by bringing nano-sized CaCO$_3$ particles into the concrete water. With the help of these particles and the surface energy of the particles, the chemical potential of the water, i.e. its freezing point, has been lowered.

When the weight of the concrete water is 40% of the weight of the cement, 18.6% of the water is bound into chemical reactions and 14.4% becomes gel water, which starts to freeze at −78° C. and continues until −192° C. The remaining 7% is capillary water, which starts to freeze at −0° C.

It is possible to lower the ice formation range of the capillary water by using "$CaCO_3 < 200$ nm" particles, according to the present invention. In the surface of these particles, the freezing point of the water molecules is −192° C., but the distance between the particles is still 1.300-600 nm.

According to the invention, primary crystals are generated with the reaction

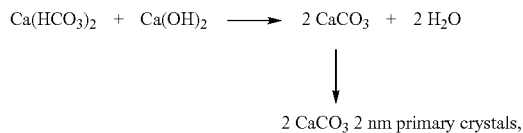

which have a space between them of approximately 3.5-5 nm.

When the particles are present, the temperature at which ice forms is lowered.

The $Ca^{2+}$ cloud which is around the $CaCO_3$ particles and the radius of curvature of the particles lower the temperature at which ice forms, too.

While the meta-kaolin sinter is absorbing water, gas bubbles penetrate into its pore structure, the size of which bubbles is at maximum 30 μm, but generally approximately 20 μm. The quantity and size of the micro bubbles are adjusted by the quantity of the meta-kaolin sinter and the composition of the gas, i.e. the air/$CO_2$ ratio. The $CO_2$ gas reacts with the hydration product, $Ca(OH)_2$, of cement so that the bubbles comprising only $CO_2$ disappear totally.

The meta-kaolin particles are uniformly distributed in the cement paste because they absorb water, and the paste stiffens around the particles for a while, thus preventing another meta-kaolin particle from entering the same space. The gas bubbles which bubble out from inside the meta-kaolin particles, remain close to the meta-kaolin particles and thus they will be uniformly distributed in the paste.

The stability of the gas bubbles was tested by vibrating with 1 impact/s for a period of 1 hour, in which case the volume of the bubbles decreased 1.7%.

An example of a frost resistant cement mixture is the following:
20 kg of meta-kaolin sinter in the cement paste, comprising 250 kg of cement CEM I 2.5 R and water 100 kg (w/c 0.4), the distance between the micro bubbles is approximately 60 μm, which gives a frost resistance of approximately 400 freezing/melting cycles. After 400 cycles, the frost resistance rises drastically.

Capillary pores open up in the surface when water is precipitated in the surface. The colloidal particles "$CaCO_3$ 2-200 nm" prevent the water from moving in the concrete and thus also prevent the generation of capillary pores in the surface layer. The "$CaCO_3$ 2-200 nm" particles within the water, which, in turn, is in the capillary pores, lower and reduce the range in which ice forms.

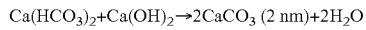

The viscosity decreasing effect of the "$CaCO_3 < 200$ nm" particles is compensated by the large surface area of the 2 nm particles of $CaCO_3$ and the strong repellent force which is caused by this large surface area.

As a consequence, the nanoparticles can be used as a means of lowering the ice formation temperature.

The plasticizing agent, which is bound to the "$CaCO_3 < 200$ nm" particles, makes it possible to reduce or remove the air-filled pores, the size of which is 1-5 mm, which pores in the structure have a tendency to be filled with water.

The Early Strength of Concrete:

The long time required for products which are bound by hydraulic binders to strengthen has to date prevented industrial production to go beyond the mechanisation stage. However, using the combination of blending agents according to the present invention it is possible to shorten the production time from the casting to the breaking of the mould to a convenient 8 hour working rhythm, and also to carry out the work in shifts. Key to the above are the early strength of the product and the corresponding time needed.

The protective porosity, which the frost resistance requires, has reduced the possibility of accelerating the strengthening process by using heat, because of internal damage to the concrete. On the other hand, adding more cement results in an increased amount of capillary water.

With the help of meta-kaolin sinter and $CaCO_3$ nanoparticles, it is possible to solve the problem and to further future automation in the concrete industry.

The meta-kaolin sinter creates such conditions in which the different production stages of the concrete products have a desired w/c. For instance:

1. Cement paste (w/c 0.4) is produced from the following components:

| | |
|---|---|
| cement | 250 kg |
| water w/c 0.4 | 100 kg |
| $CaCO_3 < 200$ nm + $Ca(HCO_3)_2$ | ≈11 kg |
| plasticizer | ( ) |

2. Addition of meta-kaolin sinter w/c−0.3220 kg

| | |
|---|---|
| meta-kaolin sinter absorbs water | −20 l |
| microbubbles | +20 l |
| w/c (100 − 20)/250 = 0.32 | |

3. When the hydration advances, the meta-kaolin sinter is filled with $Ca(OH)_2$ and pozzolanic reaction products

| | | |
|---|---|---|
| | ≈20 kg pozzolanic water | |
| | w/c = (80 kg + 18.5 kg)/250 = 0.39 | |
| Tightly | w/c | |
| | While mixing | 0.4 |
| | Early strength | 0.32 |
| | Final strength | 0.39 |

In this way a distance of 600 nm between the cement particles is achieved.

The early strength of concrete is the sum of many factors. The ratio of water to cement determines the distance between the cement particles, i.e. the distance which the hydrated crystals have to fill. According to known technology, when concrete is mixed, the w/c ratio should be high in order to generate a homogeneous product. The early strength, however, requires a low w/c ratio, which makes the cement particles stay close to each other. For the final strength, the w/c ratio must be approximately 0.4, in order to avoid tensions which are caused by autogenic shrinkage and which generate micro cracks. The transition zone between the aggregate and the binder paste decreases when the w/c ratio is not more than 0.4.

The "$CaCO_3$ 2-200 nm" particles have a considerably positive effect on the early strength. The $CaCO_3$ nanoparticles are evenly distributed in the concrete water, in which case they occupy a space between the cement particles, which shortens the route of the hydrates by 600-200 nm=400 nm, which is equivalent to approximately w/c 0.2.

Self-Compressing Concrete:

The problem with the self-compressing concrete is its sensitivity to changes. It requires very rigorous control of the concrete during casting, which casting is often beyond the control of the producer of the concrete.

With the composition of blending agents according to the present invention, it is possible to produce self-compressing concrete, the properties of which do not change under transportation, transfer and casting.

Sensitivity to Changes:

According to a preferred embodiment of the present invention, the combination of blending agents comprises nanoparticle sized calcium carbonate particles, calcium hydrogen carbonate solution and meta-kaolin sinter and limestone powder. With this combination it is possible to affect significantly the workability of the concrete and to compensate for the changes in the workability which are caused by the raw materials.

Besides by using the combination of blending agents, it is possible to reduce the changes in the hydraulic binder, i.e. the cement, by using "CEMI" quality cement, in which the use of blending agents is smaller than in the conventional "CEMII" qualities. Furthermore, a way to diminish changes caused by the aggregate is to use, as aggregate, a fraction that has a fine aggregate part of 0-5 (8) mm, one which is produced industrially in such a way that the 0-0.125 part has been removed from it. As a result, it is possible to reduce the "gluing" surface area of the paste which is formed of the hydraulic binder by 20-30%. At the same time, the part which comprises the fine aggregate and in which the variation of the water quantity is the greatest has been removed.

By means of the meta-kaolin sinter, which is included in the combination of blending agents, it is possible to remove a conventional filler. The sizes of the meta-kaolin sinter particles fit very well within the binder, without increasing the gluing surface area: 30 kg of meta-kaolin sinter—43 l, corresponds to 116 kg of filler.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of producing an aqueous suspension which is based on a hydraulic binder wherein the aqueous suspension of the binder is mixed with such a water-containing composition of blending agents which comprises particles of precipitated calcium carbonate having an average particle size of 2-1000 nm, and calcium hydrogen carbonate, and the pH value of the aqueous phase of which is below 7.

2. The method according to claim 1, that wherein the composition of blending agents comprises calcium carbonate particles having an average particle size of approximately 10-200 nm.

3. The method according to claim 1, wherein the pH of the aqueous phase of the composition of blending agents is 5.5-6.5.

4. The method according to claim 1, wherein meta-kaolin sinter particles, the quantity of which is after the addition 4-30 weight % of the quantity of binder, are added into the aqueous suspension of the binder.

5. The method according to claim 4, wherein the average particle size of the meta-kaolin sinter particles is at maximum approximately 100 μm, wherein 90% of the particles are smaller than 60 μm.

6. The method according to claim 4, wherein the density of the meta-kaolin sinter particles is approximately 0.6-1.4 $g/cm^3$ and in that they comprise 5-70 weight % of meta-kaolin.

7. The method according to claim 1, wherein plasticizer is added into the aqueous suspension, which plasticizer is attached to the surface of the calcium carbonate particles.

8. The method according to claim 1, wherein the quantity of the plasticizer is 1-40 $mg/m^2$ of the surface area of the calcium carbonate particles.

9. The method according to claim 1, wherein limestone powder having a grain size of 0.1-2 mm is added into the aqueous suspension.

10. The method according to claim 9, wherein limestone powder, which comprises at least 30 weight % of calcium carbonate, is added.

11. The method according to claim 9, wherein the quantity of the limestone powder is 0.2-4 fold the quantity of the hydraulic binder.

12. The method according to claim 1, wherein the quantity of the calcium carbonate is approximately 0.1-20% of the quantity of the binder.

13. The method according to claim 1, wherein the composition of blending agents, which comprises calcium carbonate particles and calcium hydrogen carbonate, is produced by bringing the calcium oxide-bearing initial material into contact with carbon dioxide in the aqueous phase, in which case the calcium carbonate crystals or particles are produced in a mixture, the pH of which is below 7.

14. The method according to claim 13, wherein the composition of blending agents is produced by hydrating calcium oxide with water at a temperature exceeding 100° C. and at overpressure, in order to form calcium hydroxide, and by carbonating the generated calcium hydroxide in the aqueous phase at a temperature of approximately 20-100° C. and at overpressure, until the pH value of the mixture is below 7, in order to produce an aqueous suspension comprising calcium carbonate and calcium hydrogen carbonate.

15. The method according to claim 1, wherein an aqueous suspension is produced, which comprises, as hydraulic binder, cement.

16. The method according to claim 1, wherein the ratio between the parts by weight of water and binder (w/c) in the aqueous suspension is set at a value of approximately 0.3-0.5.

17. A method of producing a hardened stone material, wherein an aqueous suspension, which is based on a hydraulic binder, is produced with a method according to claim 1 and the aqueous suspension is allowed to harden.

18. The method according to claim 17, wherein stone material is mixed into the aqueous suspension, and the generated mixture is allowed to harden.

19. The method according to claim 18, wherein stone material, 90% of the particles of which have an average particle size of less than 60 micrometers, is added into the aqueous suspension.

20. The method according to claim 17, wherein a hardened plaster layer is produced.

21. An aqueous suspension of a hydraulic binder, which suspension comprises a hydraulic binder which is mixed in water, in which case the ratio between the parts per weight of the water and the binder (w/c) is approximately 0.3-0.6, wherein the suspension comprises 1-10 parts per weight of calcium carbonate particles, which have an average particle size of 2-200 nm, per 100 parts per weight of binder, and the pH value of which is below 7.

22. The aqueous suspension according to claim 21, wherein it also comprises calcium hydrogen carbonate.

23. The aqueous suspension according to claim 21, wherein the calcium carbonate particles are mixed into the suspension in the form of such a composition of blending agents, which comprises calcium carbonate particles and calcium hydrogen carbonate and the pH value of which is approximately 5.5-6.5.

24. An aqueous suspension of a hydraulic binder, which suspension comprises a hydraulic binder which is mixed in water, in which case the ratio between the parts per weight of the water and the binder (w/c) is approximately 0.3-0.6, wherein the suspension comprises 1-10 parts per weight of calcium carbonate particles, which have an average particle size of 2-200 nm, per 100 parts per weight of binder, and the pH value of which is below 7 wherein it is produced with a method according to claim 1.

* * * * *